(12) United States Patent
Nemoto et al.

(10) Patent No.: US 7,784,333 B2
(45) Date of Patent: Aug. 31, 2010

(54) MEASUREMENT CONTROL DEVICE AND MEASUREMENT CONTROL METHOD

(75) Inventors: Kentaro Nemoto, Kawasaki (JP); Takeshi Yamamoto, Kawasaki (JP)

(73) Assignee: Mitutoyo Corporation, Kawasaki-shi (JP)

(*) Notice: Subject to any disclaimer, the term of this patent is extended or adjusted under 35 U.S.C. 154(b) by 582 days.

(21) Appl. No.: 11/798,452

(22) Filed: May 14, 2007

(65) Prior Publication Data

US 2007/0266781 A1 Nov. 22, 2007

(30) Foreign Application Priority Data

May 16, 2006 (JP) ............... 2006-136628

(51) Int. Cl.
*G01B 21/20* (2006.01)
*G01B 21/30* (2006.01)
(52) U.S. Cl. .................. 73/105; 73/104; 33/503; 33/504; 33/551; 33/556; 33/559; 33/561
(58) Field of Classification Search ............ 73/104, 73/105; 33/503, 504, 551, 556, 559, 561
See application file for complete search history.

(56) References Cited

U.S. PATENT DOCUMENTS 5,146,690 A 9/1992 Breitmeier 6,158,136 A * 12/2000 Gotz et al. ............. 33/503
6,314,800 B1 11/2001 Nishimura
6,604,295 B2 8/2003 Nishimura et al.

FOREIGN PATENT DOCUMENTS

| DE | 40 13 742 A1 | 10/1991 |
|---|---|---|
| DE | 101 12 316 A1 | 12/2001 |
| EP | 1 760 422 A1 | 3/2007 |
| JP | A 2000-011563 | 1/2000 |
| JP | A 2000-089829 | 3/2000 |
| JP | A 2000-180156 | 6/2000 |
| JP | A 2001-166831 | 6/2001 |
| JP | A 2004-077307 | 3/2004 |
| JP | A 2005-043177 | 2/2005 |

* cited by examiner

*Primary Examiner*—Daniel S Larkin
(74) *Attorney, Agent, or Firm*—Oliff & Berridge, PLC

(57) ABSTRACT

An approach controller (234) of a coordinate measuring instrument enables a position control loop (RP) and drives an actuator (133) so that a force sensor (1) is brought to a close position under a position control. When recognizing that the force sensor (1) reaches the close position, a contact controller (235) controls a switch (227) to enable a force control loop (RF) and drives the actuator (133) to bring the force sensor (1) into contact with a workpiece under a force control.

3 Claims, 10 Drawing Sheets

MEASUREMENT CONTROL DEVICE AND MEASUREMENT CONTROL METHOD

BACKGROUND OF THE INVENTION

1. Field of the Invention

The present invention relates to a measurement control device, a contour measuring instrument and a measurement control method. For example, the present invention relates to a measurement control device, a contour measuring instrument and a measurement control method used when a contour such as a profile and roughness of a surface of a workpiece is measured using a vibrating sensor.

2. Description of Related Art

There have been known contour measuring instruments that measure a contour such as a profile and roughness of a surface of a workpiece by scanning the surface of the workpiece, the contour measuring instruments including a roughness measuring instrument, a profile measuring instrument, a roundness measuring instrument and a coordinate measuring instrument.

In such measuring instruments, a vibrating force sensor (hereinafter, abbreviated as a force sensor) 1 as shown in FIG. 7 has been used, the sensor detecting a surface of a workpiece based on a minute displacement of a contact section contacting with the surface of the workpiece.

The force sensor 1 shown in FIG. 7 includes a metal base 2, a stylus 3 integrally formed on the base 2, a vibrating element 4 that vibrates (in an axial direction) the stylus 3 and a detecting element 5 that detects a vibration state of the stylus 3 and outputs the vibration state as a detection signal. A contact point (contact section) 6 formed of a diamond chip or ruby is fixedly bonded to a tip end of the stylus 3. The vibrating element 4 and the detecting element 5 are formed by one piezoelectric element, the piezoelectric element fixedly bonded on each of front and back surfaces of the base 2.

As shown in FIG. 8, when a vibration signal Pi (voltage signal) having predetermined frequency and amplitude is applied to the vibrating element 4 of the force sensor 1, the detecting element 5 obtains a detection signal Qo (voltage signal) having predetermined frequency and amplitude.

FIG. 9 shows variation in the amplitude of the detection signal Qo caused by contact with a workpiece W. In a state where the stylus 3 is not in contact with the workpiece W, when the vibration signal Pi having a certain amplitude at a resonance frequency of the stylus 3 is applied to the vibrating element 4, the stylus 3 resonates, which provides the detection signal Qo having an amplitude Ao to the detecting element 5. When the stylus 3 comes into contact with the workpiece W, the amplitude of the detection signal Qo attenuates from Ao to Ax.

A relationship between an attenuation rate k (Ax/Ao) and a measuring force is shown in FIG. 10.

Here, description will be given by taking an example of a case where the detection signal Qo in a contact state of the stylus 3 (force sensor 1) and the workpiece W is attenuated to 90% of the non-contact state (i.e., attenuation rate k=0.9). As seen from the relationship in FIG. 10, the measuring force in the contact state is 135 [μN].

Accordingly, by controlling with an actuator or the like a distance between the force sensor 1 and the workpiece W such that the attenuation rate k is always constant when the force sensor 1 contacts with the workpiece W, a profile and roughness of the workpiece W can be measured with a constant measuring force.

In the contour measuring instrument having the force sensor 1 as described above, there has been a demand for an arrangement capable of minimizing overshoot in the contact state of the force sensor and the workpiece.

Meanwhile, there have also been known contour measuring instruments having a force sensor that can perform measurement using a principle similar to that of the force sensor 1 or a principle different therefrom (see, for instance, Document 1: JP-A-2000-180156, Document 2: JP-A-2005-43177 and Document 3: JP-A-2004-77307).

There have also been known arrangements for controlling a position of a certain component (see, for instance, Document 4: JP-A-2001-166831, Document 5: JP-A-2000-89829 and Document 6: JP-A-2000-11563).

In the arrangement disclosed in Document 1, the stylus is brought into contact with a surface of the workpiece. Then, a detecting electrode detects a measuring force of the stylus and transmits a detection signal to a measuring force control circuit via a detection circuit. In the measuring force control circuit, a difference between a signal value corresponding to a preset measuring force and the signal from the detection circuit is calculated and a measuring force adjusting mechanism is controlled, thereby maintaining the measuring force between the stylus and the workpiece to a predetermined value.

In the arrangement disclosed in Document 2, a control device receives a command value from the coordinate measuring instrument, position information in X, Y and Z directions from a scale provided on a three-axis slider and an actual measuring force detected by a strain gauge. Then, an actuator is controlled by a feed-back control such that a difference between the actual measuring force detected by the strain gauge and a measuring value commanded from the coordinate measuring instrument becomes small.

In the arrangement disclosed in Document 3, after a position control is started, a Z-axis slider is brought closer to a workpiece until a predetermined time period elapses under a condition in which a pressure is maintained to a contact-judging pressure. When the predetermined time period elapses, the Z-slider is stopped. Then, an average value of the pressure during the predetermined time period is obtained, where the control of the Z-slider is switched from the position control to a pressure control when the average value reaches a target pressure.

In the arrangement disclosed in Document 4, a position command issuing section outputs, as a position command, target position data of a position to which a movable body is desired to move. A speed feed-forward pulse setting section arbitrarily sets amplitude, range and cycle of a pulse. After the position command issuing section outputs the position command, the speed feed-forward pulse setting section outputs the pulse set by the speed feed-forward pulse setting section as a speed feed-forward signal. Then, the movable body is controlled by an attenuator or the like so as to be positioned at the target position based on the speed feed-forward signal.

In the arrangement disclosed in Document 5, the overshoot is controlled to be small by a distribution mechanism that feeds back a motor-rotation-angle position signal of a motor when an absolute value of a positional deviation between a position command and a fed-back signal is large while feeds back a position signal of a machine movable section when the absolute value of the positional deviation is small.

The arrangement disclosed in Document 6 includes a coarse actuator that positions a head at a predetermined position on a disc and a fine actuator that finely adjust the position of the head that has been positioned by the coarse actuator. Then, by controlling the coarse and fine actuators, the overshoot of the position of the head is suppressed.

However, in the arrangements of Documents 1 and 2, since measuring force of the force sensor is detected and a position of the force sensor is controlled based on the detected measuring force, the overshoot in the contact state of the force sensor and the workpiece might be large, resulting in breakage of the force sensor and the workpiece.

In the arrangement of Document 3, since the entire Z-slider is controlled, the overshoot might become large due to the inertia of the Z-slider, resulting in the breakage of the force sensor and the workpiece.

In the arrangement of Document 4, since the position of the movable body is controlled based on the position command of the preset target position, it might be difficult to apply the arrangement to the contour measuring instrument in which a distance between a current position of the force sensor and the workpiece varies in accordance with a contour of the workpiece.

In the arrangement of Document 5, since a ratio of the magnitude of the fed-back signal is determined by the positional deviation between the position command and the fed-back signal, the application of the arrangement to the contour measuring instrument lowers the speed of bringing the force sensor closer to the workpiece, which might result in degradation of measuring efficiency in a measurement with a lot of measuring points.

In the arrangement of Document 6, since the position is controlled by moving the coarse and fine actuators, the control of the two actuators might be complicated when the arrangement is applied to the contour measuring instrument.

SUMMARY OF THE INVENTION

An object of the present invention is to provide a measurement control device, a contour measuring instrument and a measurement control method that can suppress overshoot in a contact state of a force sensor and a workpiece with a simple arrangement and without degrading measuring efficiency.

A measurement control device according to an aspect of the present invention includes: a probe including a force sensor that detects a measuring force generated when the probe contacts with a workpiece and outputs the measuring force as a force detection signal, a position detector that detects a measuring position of the workpiece detected by the force sensor and outputs the measuring position as measuring position information, and a force sensor moving unit that moves the force sensor relative to the workpiece; a force control loop that compares the force detection signal from the force sensor as a force fed-back signal with a set force value and drives the force sensor moving unit such that the force fed-back signal becomes equal to the set force value; a position control loop that compares the measuring position information from the position detector as a position fed-back signal with a set position value and drives the force sensor moving unit such that the position fed-back signal becomes equal to the set position value; a control loop switcher that enables one of the force control loop and the position control loop; an approach controller that controls the control loop switcher to enable the position control loop and drives the force sensor moving unit to position the force sensor in a close position that is close to the workpiece in such a manner that the position fed-back signal becomes equal to the set position value; and a contact controller that, when recognizing that the force sensor is brought to the close position to the workpiece under the control of the approach controller, controls the control loop switcher to enable the force control loop and drives the force sensor moving unit to bring the force sensor into contact with the workpiece in such a manner that the force fed-back signal becomes equal to the set force value.

According to the aspect of the present invention, the approach controller enables the position control loop and drives the force sensor moving unit such that the position fed-back signal becomes equal to the set position value, thereby positioning the force sensor at the close position to the workpiece. When recognizing that the force sensor is positioned at the close position to the workpiece, the contact controller controls the control loop switcher to enable the force control loop and drives the force sensor moving unit such that the force fed-back signal becomes equal to the set force value, thereby bringing the force sensor into contact with the workpiece.

With the arrangement, by switching the control from the position control to the force control before the force sensor contacts with the workpiece and by bringing the force sensor into contact with the workpiece under the force control, the overshoot at the time of contact can be suppressed as compared to a related art arrangement in which the force control is performed after the force sensor contacts with the workpiece.

In addition, since only the force sensor is moved instead of the entire probe, the inertia in moving the fore sensor can be reduced, so that an increase of overshoot due to the inertia can be suppressed.

Since a moving amount required in bringing the force sensor into contact with the workpiece does not have to be preset, the present invention can be applied to a contour measuring instrument in which a distance between a current position of the force sensor and the workpiece varies in accordance with the contour of the workpiece.

Further, since the force sensor is brought close to the workpiece under the position control and then the control is switched to the force control, measuring efficiency can be prevented from degrading even in a measurement with a lot of measuring points.

Still further, the force sensor can be moved relative to the workpiece by the single force sensor moving unit, so that an arrangement for controlling the movement will not be complicated.

Accordingly, the overshoot in contacting the force sensor with the workpiece can be suppressed with such a simple arrangement and without degrading the measuring efficiency.

In the measurement control device according to the aspect of the present invention, it is preferable that the force sensor includes a stylus having a contact section on a tip end thereof, a vibrating element that vibrates the stylus and a detecting element that detects a vibration state of the stylus and outputs the vibration state as a detection signal.

According to the aspect of the present invention, the force sensor includes the stylus, the vibrating element and the detecting element.

The arrangement can suppress the overshoot in contacting a so-called vibrating force sensor, which can perform highly accurate measurement with a small measuring force, with the workpiece, thereby providing a measuring control device realizing measurement with even higher accuracy.

A contour measuring instrument according to another aspect of the present invention includes: the above-described measurement control device of the present invention; a probe holder that holds the probe of the measurement control device; a probe-relative-movement unit that relatively moves the probe holder and the workpiece; a probe position controller that controls the probe-relative-movement unit to position the force sensor of the probe and the workpiece such that the force sensor and the workpiece are positioned remoter as compared to the close position in the control of the approach controller of the measurement control device, in which when recognizing that the force sensor and the workpiece are positioned remoter as compared to the close position in the control of the probe position controller, the approach controller positions the force sensor and the workpiece close to each other.

According to still another aspect of the present invention, a measurement control method using a measurement control device including: a probe that includes a force sensor that detects a measuring force generated when the probe contacts with a workpiece and outputs the measuring force as a force detection signal, a position detector that detects a measuring position of the workpiece detected by the force sensor and outputs the measuring position as measuring position information, and a force sensor moving unit that moves the force sensor relative to the workpiece; a force control loop that compares the force detection signal from the force sensor as a force fed-back signal with a set force value and drives the force sensor moving unit such that the force fed-back signal becomes equal to the set force value; a position control loop that compares the measuring position information from the position detector as a position fed-back signal with a set position value and drives the force sensor moving unit such that the position fed-back signal becomes equal to the set position value; and a control loop switcher that enables one of the force control loop and the position control loop includes: controlling the control loop switcher to enable the position control loop and driving the force sensor moving unit to move the force sensor to a close position to the workpiece in such a manner that the position fed-back signal becomes equal to the set position value; controlling, when recognizing that the force sensor is brought to the close position to the workpiece, the control loop switcher to enable the force control loop and driving the force sensor moving unit to bring the force sensor into contact with the workpiece in such a manner that the force fed-back signal becomes equal to the set force value.

According to these aspects of the present invention, the contour measuring instrument and the measurement control method which have advantages similar to those of the above-described measurement control device can be provided.

DETAILED DESCRIPTION OF PREFERRED EMBODIMENT(S)

An embodiment of the present invention will be described with reference to the attached drawings.

[Arrangement of Coordinate Measuring Instrument]

Now, a coordinate measuring instrument as a contour measuring instrument according to an embodiment of the present invention will be described.

Figure 1:
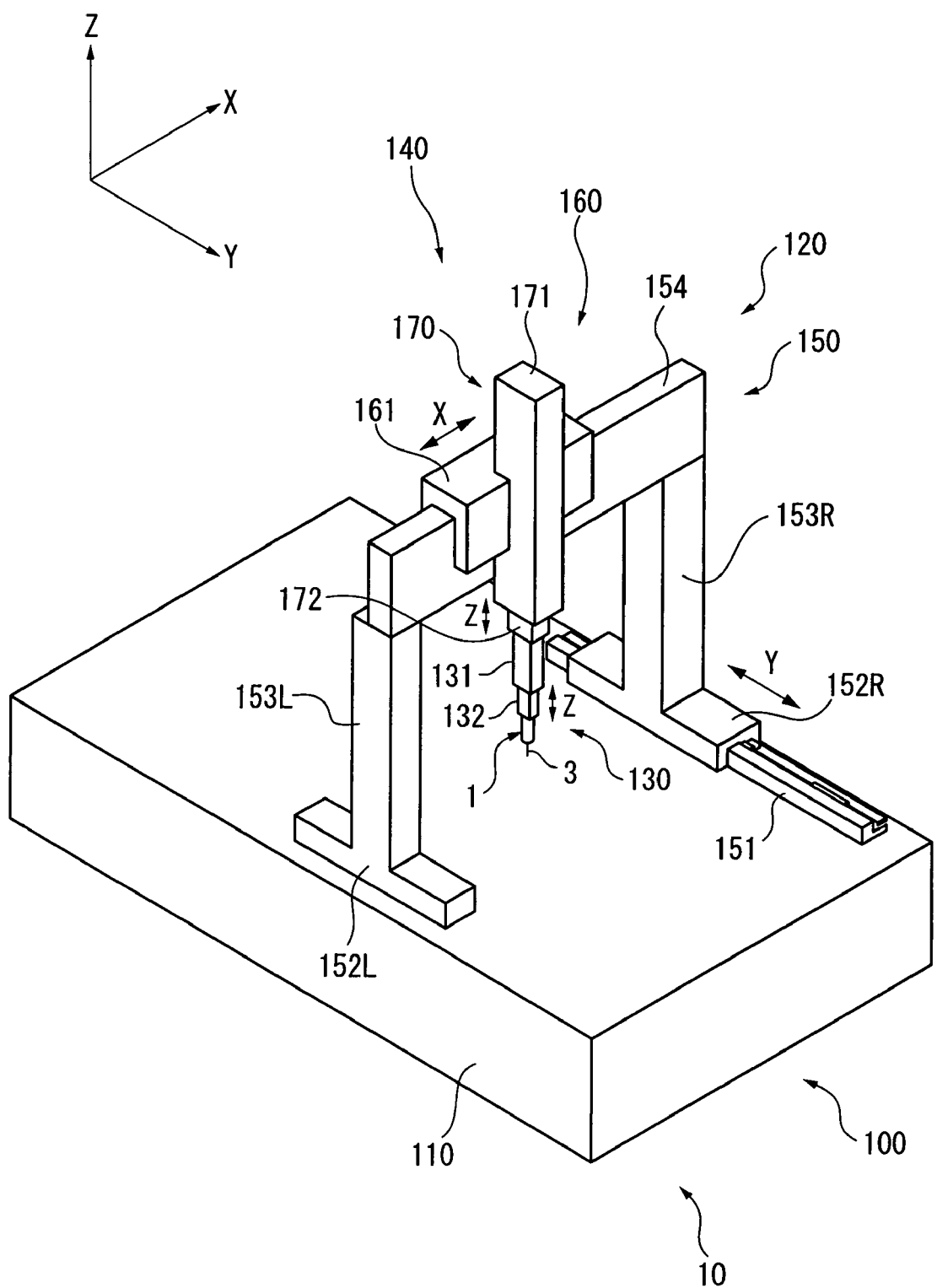
FIG. 1 is a perspective view of a coordinate measuring device of a coordinate measuring instrument according to an embodiment of the present invention.
Figure 2:
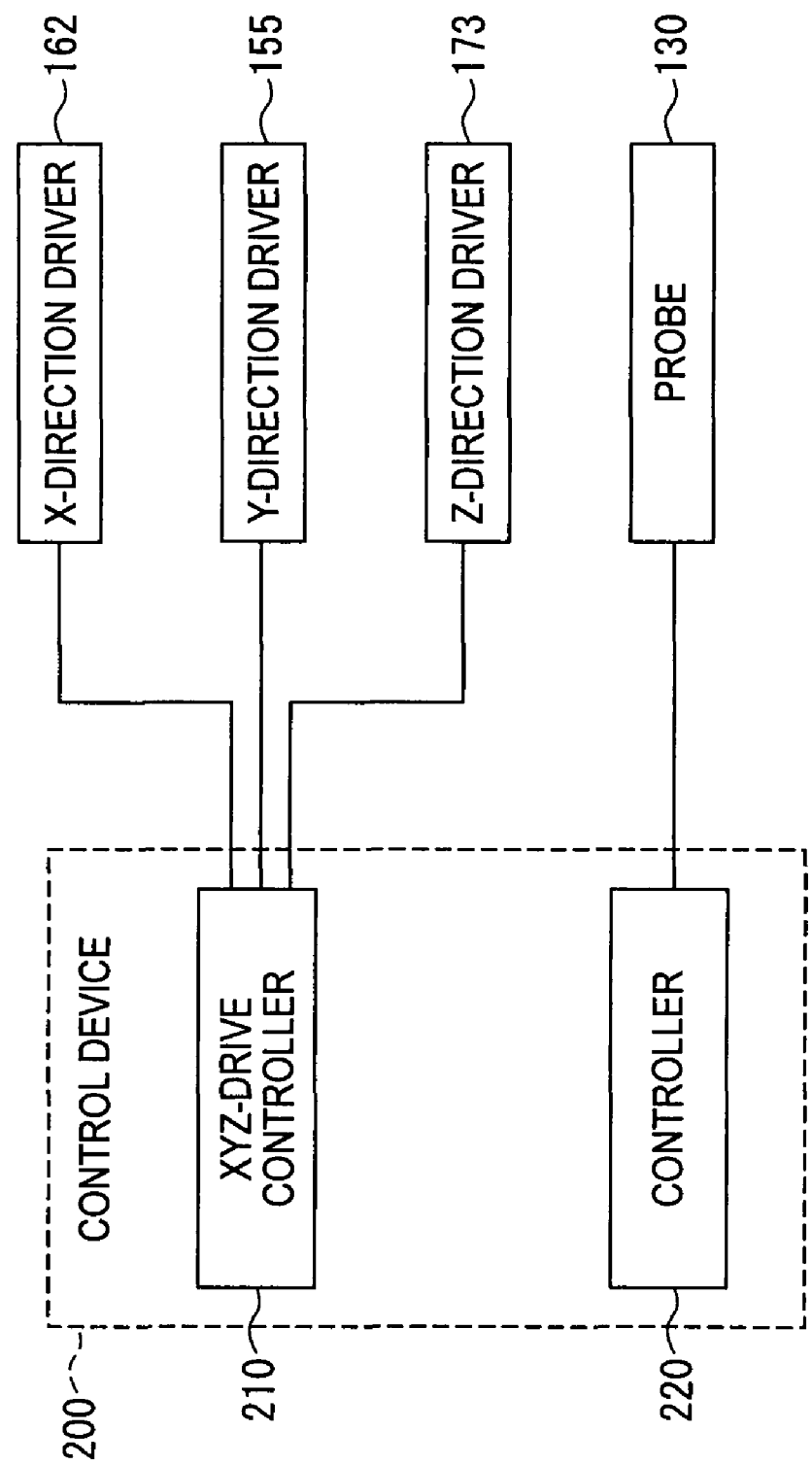
FIG. 2 is a block diagram showing an outline of a primary part of the coordinate measuring instrument according to the embodiment.
Figure 3:
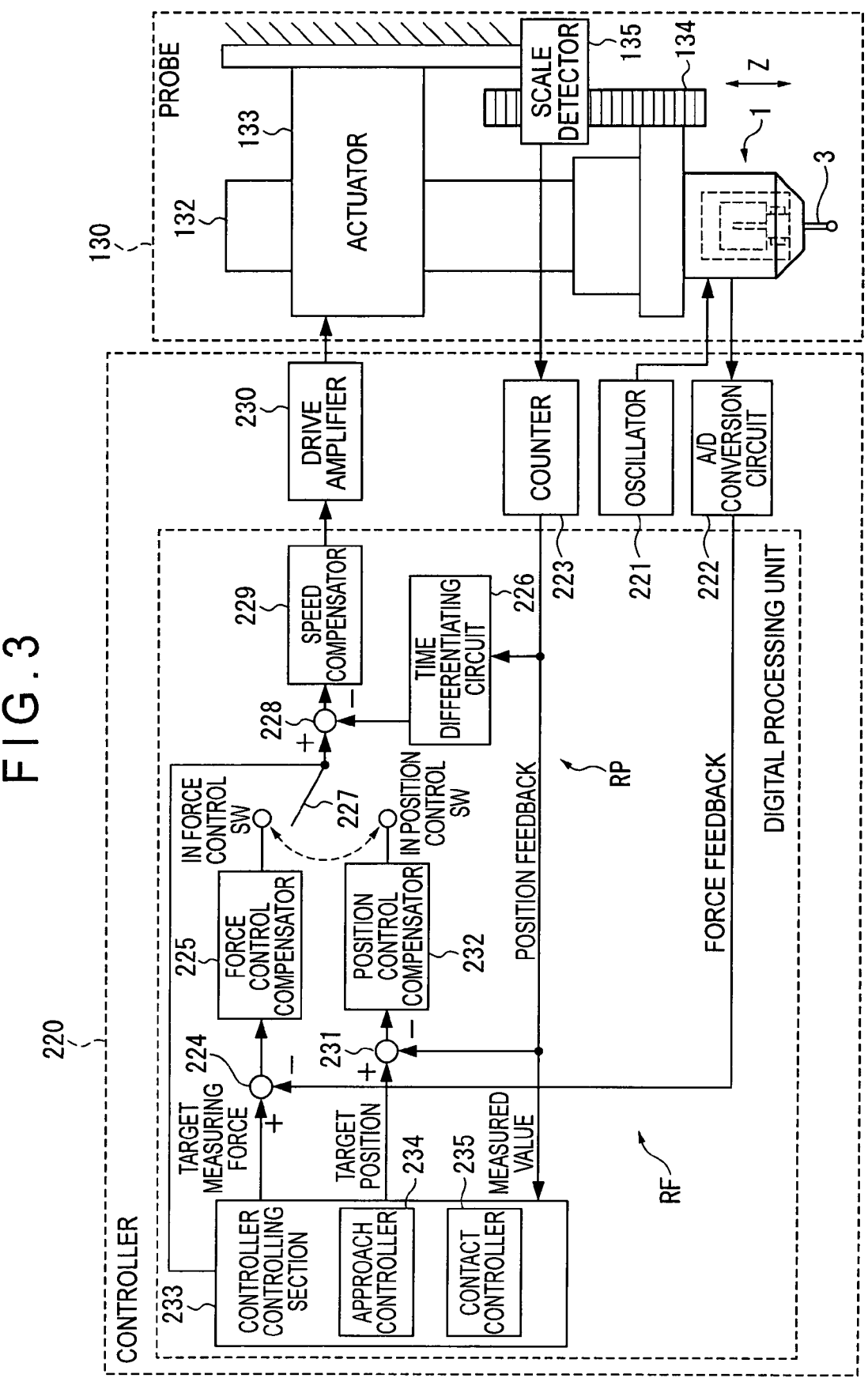
FIG. 3 is a schematic diagram showing outlines of a controller and a probe according to the embodiment.

FIG. 1 is a perspective view of a coordinate measuring device of the coordinate measuring instrument according to the embodiment of the present invention. FIG. 2 is a block diagram showing an outline of a primary part of the coordinate measuring instrument. FIG. 3 is a schematic diagram showing outlines of a controller and a probe.

The coordinate measuring instrument 10 includes a coordinate measuring device 100 as shown in FIG. 1 and a control device 200 as shown in FIG. 2.

As shown in FIG. 1, the coordinate measuring device 100 includes a mounting section 110 and a measuring unit 120.

The mounting section 110 is formed in a flattened prism shape having an upper surface that is precisely flattened to mount a workpiece.

For convenience of explanation, two directions orthogonal to each other on the upper surface of the mounting section 110 are respectively defined as an X-direction and a Y-direction, while a direction vertical to the upper surface of the mounting section 110 is defined as a Z-direction.

The measuring unit 120 includes a probe 130 and a relative movement mechanism 140 that moves the probe 130 in the X-, Y- and Z-directions.

As shown in FIGS. 1 and 3, the probe 130 includes: a casing 131 having a substantially rectangular box-like shape provided on the relative movement mechanism 140; a probe body 132 provided in the casing 131 with one end in a longitudinal direction exposed outside; a force sensor 1 provided on the one end side in the longitudinal direction of the probe body 132; an actuator 133 (force sensor moving unit) that holds the probe body 132 and advances and retracts the force sensor 1 relative to the workpiece in the Z-direction; a scale 134 that is attached to the probe body 132; and a scale detector 135 (position detector) that detects based on the scale 134 a displacement amount of the force sensor 1 displaced by the actuator 133 (i.e., measuring position information in measuring the workpiece the force sensor 1).

The relative movement mechanism 140 includes a Y-direction slide mechanism 150, an X-direction slide mechanism 160 and a Z-direction slide mechanism 170.

As shown in FIGS. 1 and 2, the Y-direction slide mechanism 150 includes: a Y-guide rail 151 provided in the Y-direction on the mounting section 110; a Y-slider 152R (probe-relative-movement mechanism) provided so as to be movable along the Y-guide rail 151; a Y-slider 152L (probe-relative-movement mechanism) provided as a pair with the Y-slider 152R so as to be movable in the Y-direction on the mounting section 110; supporting columns 153R, 153L that are respectively provided on the Y-sliders 152R, 152L; an X-beam 154 having ends that are respectively supported by the two supporting columns 153R, 153L; and a Y-direction driver 155 that moves the Y-sliders 152R, 152L in the Y-direction.

The Y-direction driver 155 is connected to the control device 200 and moves the Y-sliders 152R, 152L in the Y-direction under the control of the control device 200.

Air bearings (not shown) are each provided between the Y-guide rail 151 and the Y-slider 152R and between the mounting section 110 and the Y-slider 152L. A relative moving amount of the Y-guide rail 151 and the Y-slider 152R is measured by a displacement detector (not shown).

As shown in FIGS. 1 and 2, the X-direction slide mechanism 160 includes: an X-slider 161 (prove relative movement mechanism) that is provided to be movable in a longitudinal direction of the X-beam 154 (i.e., in the X-direction); and an X-direction driver 162 that moves the X-slider 161 in the X-direction.

The X-direction driver 162 is connected to the control device 200 and moves the X-slider 161 in the X-direction under the control of the control device 200.

A relative moving amount of the X-beam 154 and the X-slider 161 is measured by a displacement detector (not shown).

As shown in FIGS. 1 and 2, the Z-direction slide mechanism 170 includes: a Z-axis supporter 171 fixed on the X-slider 161; a movable arm 172 (probe-relative-movement mechanism and probe holder) that is moved relative to the Z-axis supporter 171 in a manner sliding in the Z-direction; and a Z-direction driver 173 that moves the movable arm 172 in the Z-direction.

The casing 131 of the probe 130 is attached on a the tip end of the movable arm 172.

The Z-direction driver 173 is connected to the control device 200 and moves, under the control of the control device 200, the movable arm 172 independently of the probe body 132 in the Z-direction.

A relative moving amount of the Z-axis supporter 171 and the movable arm 172 is measured by a displacement detector (not shown).

As shown in FIG. 2, the control device 200 includes: an XYZ-drive controller 210 (probe position controller) that controls the Y-direction driver 155, the X-direction driver 162 and the Z-direction driver 173; and a controller 220 that controls the probe 130.

The XYZ-drive controller 210 is connected to the Y-direction driver 155, the X-direction driver 162 and the Z-direction driver 173. The XYZ-drive controller 210 controls the drivers 155, 162, 173 to respectively move the Y-sliders 152R, 152L, the X-slider 161 and the movable arm 172 in order to move the probe 130 to the probe-controllable position. The probe-controllable position is a position where the force sensor 1 can be brought into contact with the workpiece only by the drive of the actuator 133.

As shown in FIG. 3, the controller 220 includes: an oscillator 221 that applies a vibration signal to the force sensor 1 to vibrate the force sensor 1; an A/D conversion circuit 222 that converts an analogue detection signal from the force sensor 1 to a digital signal; a counter 223 that counts a signal from the scale detector 135 and outputs the measuring position information from the force sensor 1 as a position measuring value; a processing unit 224 that calculates a deviation between the output from the A/D conversion circuit 222 (force fed-back signal) and a target measuring force; a force control compensator 225 that receives an output from the processing unit 224; a time differentiating circuit 226 that differentiates the position signal from the counter 223 to convert the position signal to a speed signal; a switch 227 (control loop switcher); a processing unit 228 that calculates a deviation between an output from the time differentiating circuit 226 and an output from the force control compensator 225 that is received via the switch 227; a speed compensator 229 that receives an output from the processing unit 228; a drive amplifier 230 that drives the actuator 133 based on an output from the speed compensator 229; a processing unit 231 that calculates a deviation between a measured value (position information) of the counter 223 and the target position; a position control compensator 232 that applies an output from the processing unit 231 to the processing unit 228 via the switch 227; and a controller controlling section 233 (measurement control device) connected to the processing units 224, 231 and the counter 223.

The force sensor 1, the A/D conversion circuit 222, the processing unit 224, the force control compensator 225, the processing unit 228, the speed compensator 229, the drive amplifier 230 and the actuator 133 form a force control loop RF that compares the force detection signal from the force sensor 1 as the force fed-back signal with the target measuring force (set force value) and drives the actuator 133 such that the force fed-back signal becomes equal to the target measuring force.

The scale detector 135, the counter 223, the processing unit 231, the position control compensator 232, the processing unit 228, the speed compensator 229, the drive amplifier 230 and the actuator 133 form a position control loop RP that compares the measuring position information from the scale detector 135 as the position fed-back signal with a set position value (target position) and drives the actuator 133 such that the position fed-back signal becomes equal to the target position.

The switch 227 is controlled by the controller controlling section 233 to enable one of the force control loop RF and the position control loop RP.

Hereinafter, the control of the actuator 133 by the force control loop RF will be referred to as a force control, while the control of the actuator 133 by the position control loop RP will be referred to as a position control.

The controller controlling section 233 includes an approach controller 234 that controls the force sensor 1 to approach the workpiece and a contact controller 235 that controls the force sensor 1 to come into contact with the workpiece.

When recognizing that the probe 130 reaches the probe-controllable position under the control of the XYZ-drive controller 210, the approach controller 234 controls the switch 227 to enable the position control loop RP. Then, the actuator 133 is driven by the position control to bring the force sensor 1 to a close position where the force sensor 1 is positioned close to the workpiece.

When recognizing that the probe 1 reaches the close position under the control of the approach controller 234, the contact controller 235 controls the switch 227 to enable the force control loop RF. Then, the actuator 133 is driven by the force control to bring the force sensor 1 into contact with the workpiece.

[Operation of Coordinate Measuring Instrument]

Now, an operation of the coordinate measuring instrument 10 will be described.

Figure 4D:
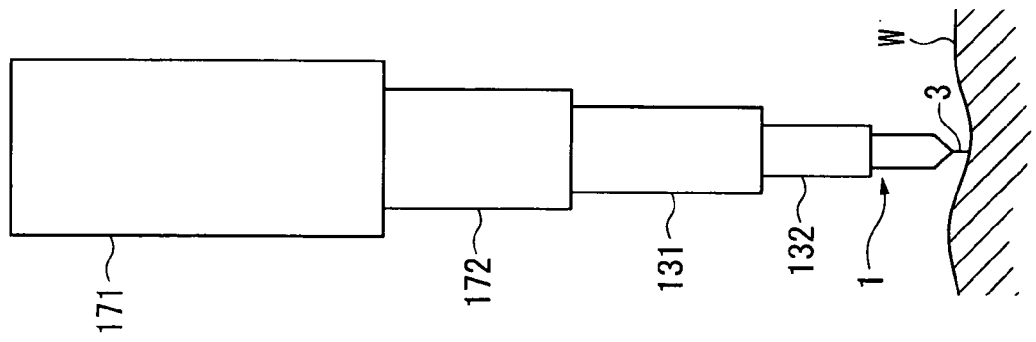
FIG. 4D is a schematic diagram showing the positional relationship between the force sensor and the workpiece in the measurement, where the force sensor is moved by the actuator from the state shown in FIG. 4C and brought into contact with the workpiece under a force control.
Figure 4C:
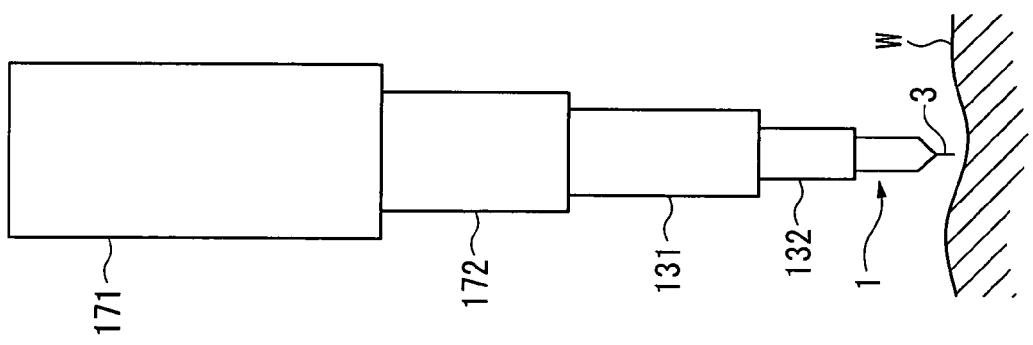
FIG. 4C is a schematic diagram showing the positional relationship between the force sensor and the workpiece in the measurement, where the force sensor is moved by an actuator from the state shown in FIG. 4B to a close position under a position control.
Figure 4B:
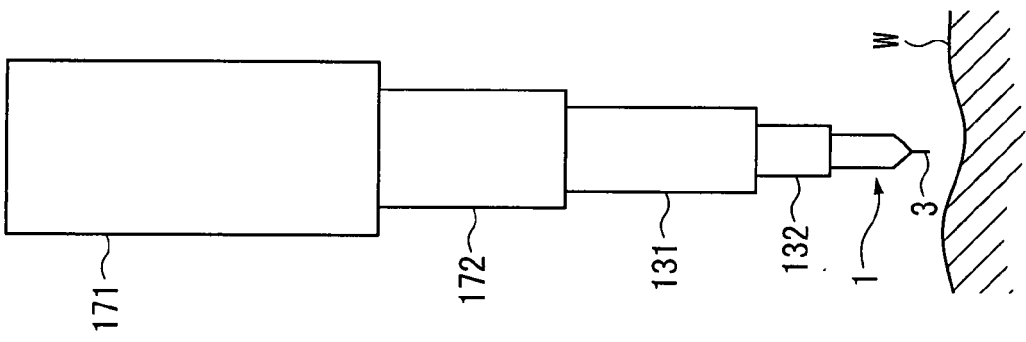
FIG. 4B is a schematic diagram showing the positional relationship between the force sensor and the workpiece in the measurement, where the force sensor is moved by an X-direction driver, a Y-direction driver and a Z-direction driver from the state shown in FIG. 4A to a probe-controllable position.
Figure 4A:
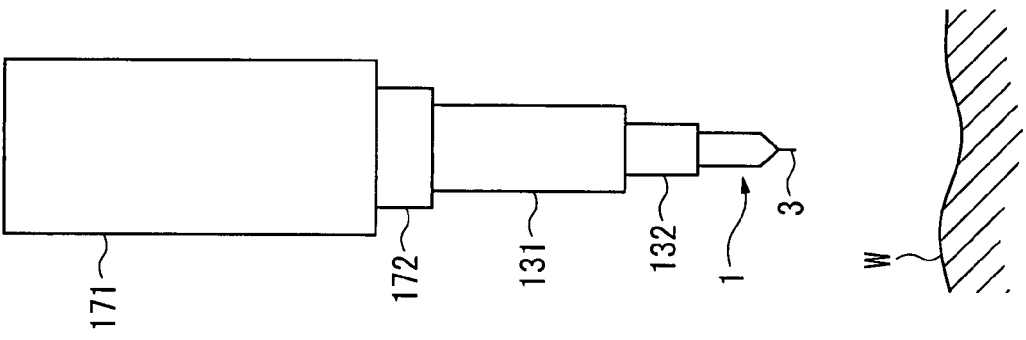
FIG. 4A is a schematic diagram showing a positional relationship between a force sensor and a workpiece in an initial state of measurement according to the embodiment.
Figure 5:
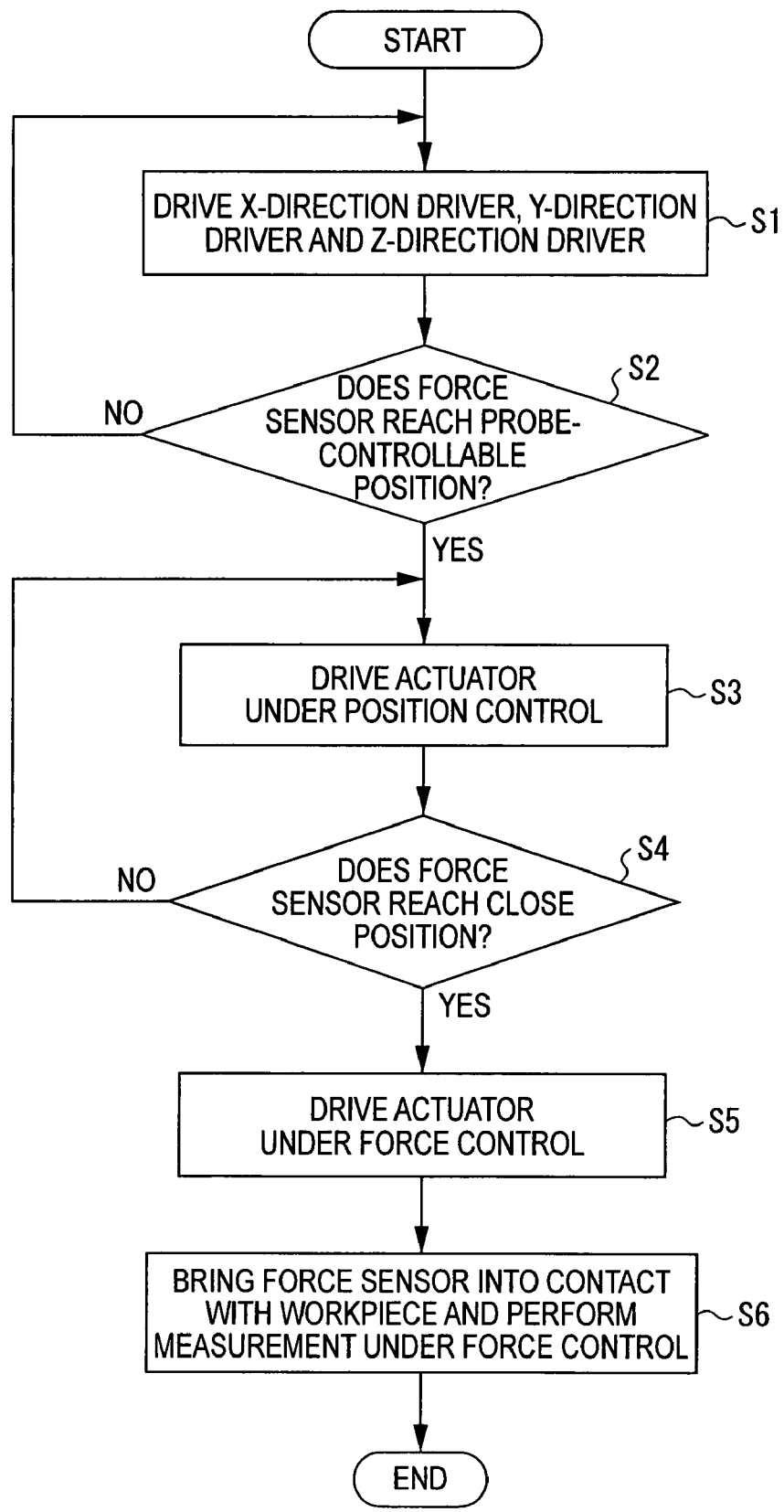
FIG. 5 is a flowchart showing the measurement using the coordinate measuring instrument according to the embodiment.
Figure 6:
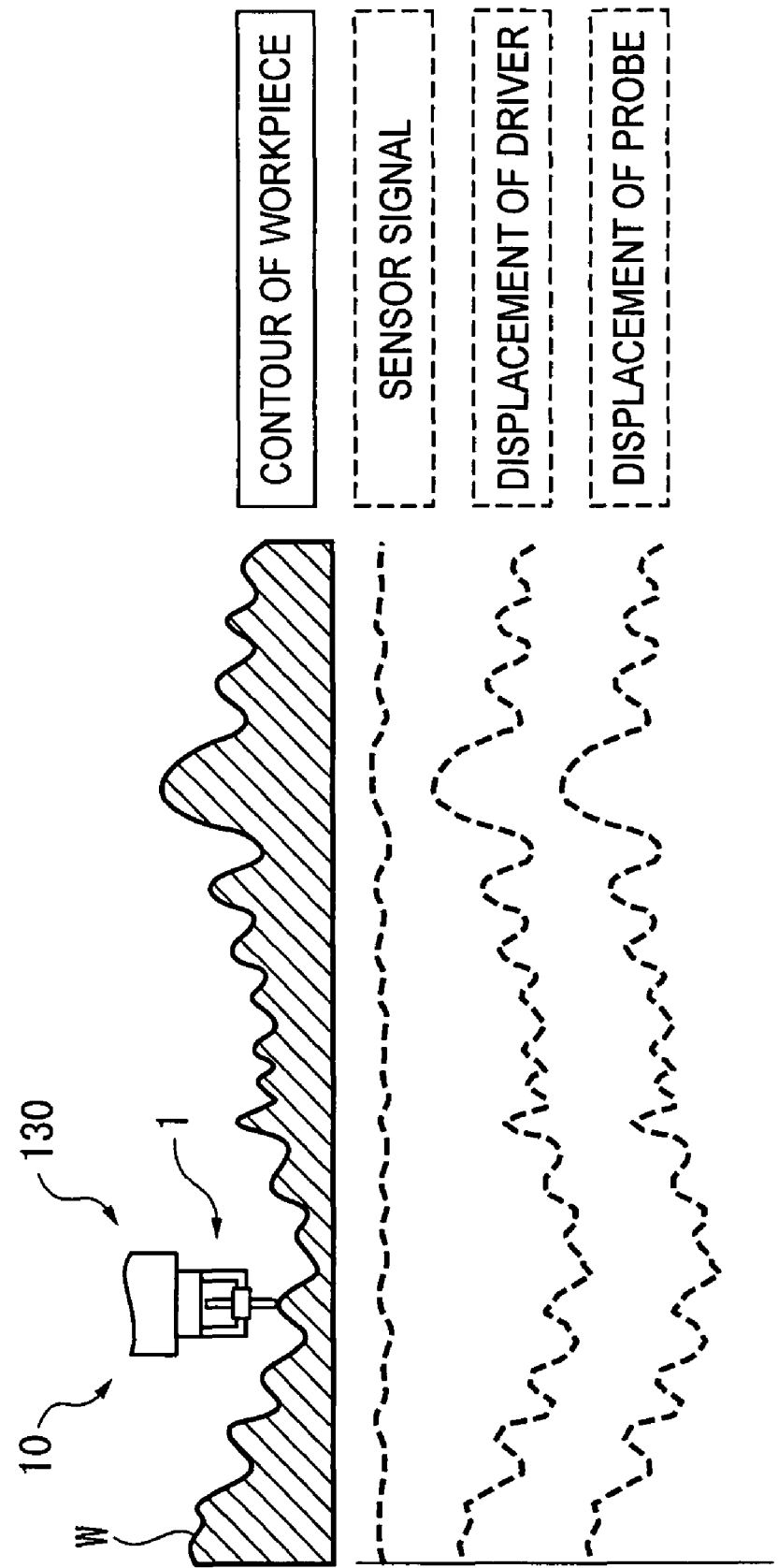
FIG. 6 is a conceptual diagram showing how the workpiece is measured according to the embodiment.
Figure 7:
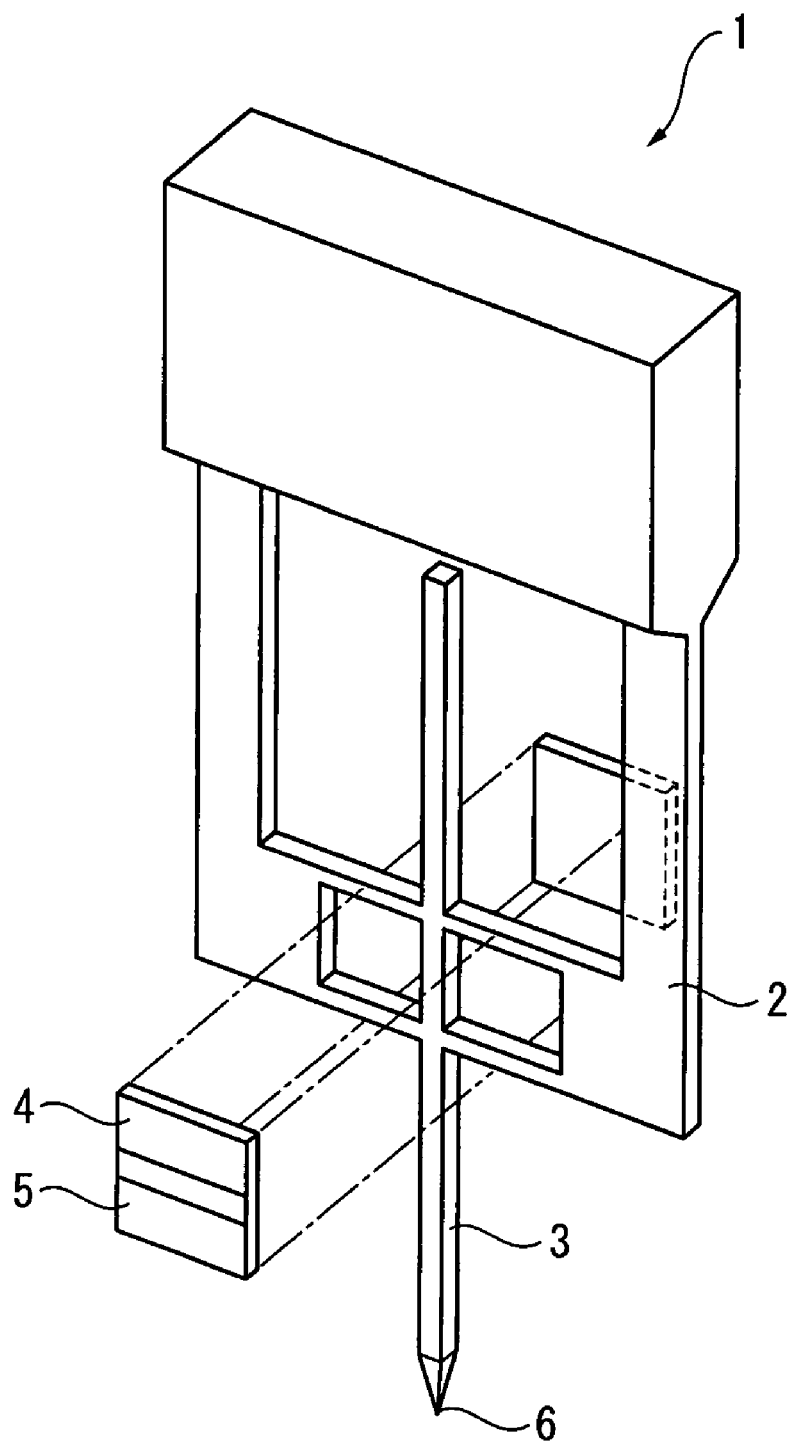
FIG. 7 is an exploded perspective view showing an arrangement of a force sensor.
Figure 8:
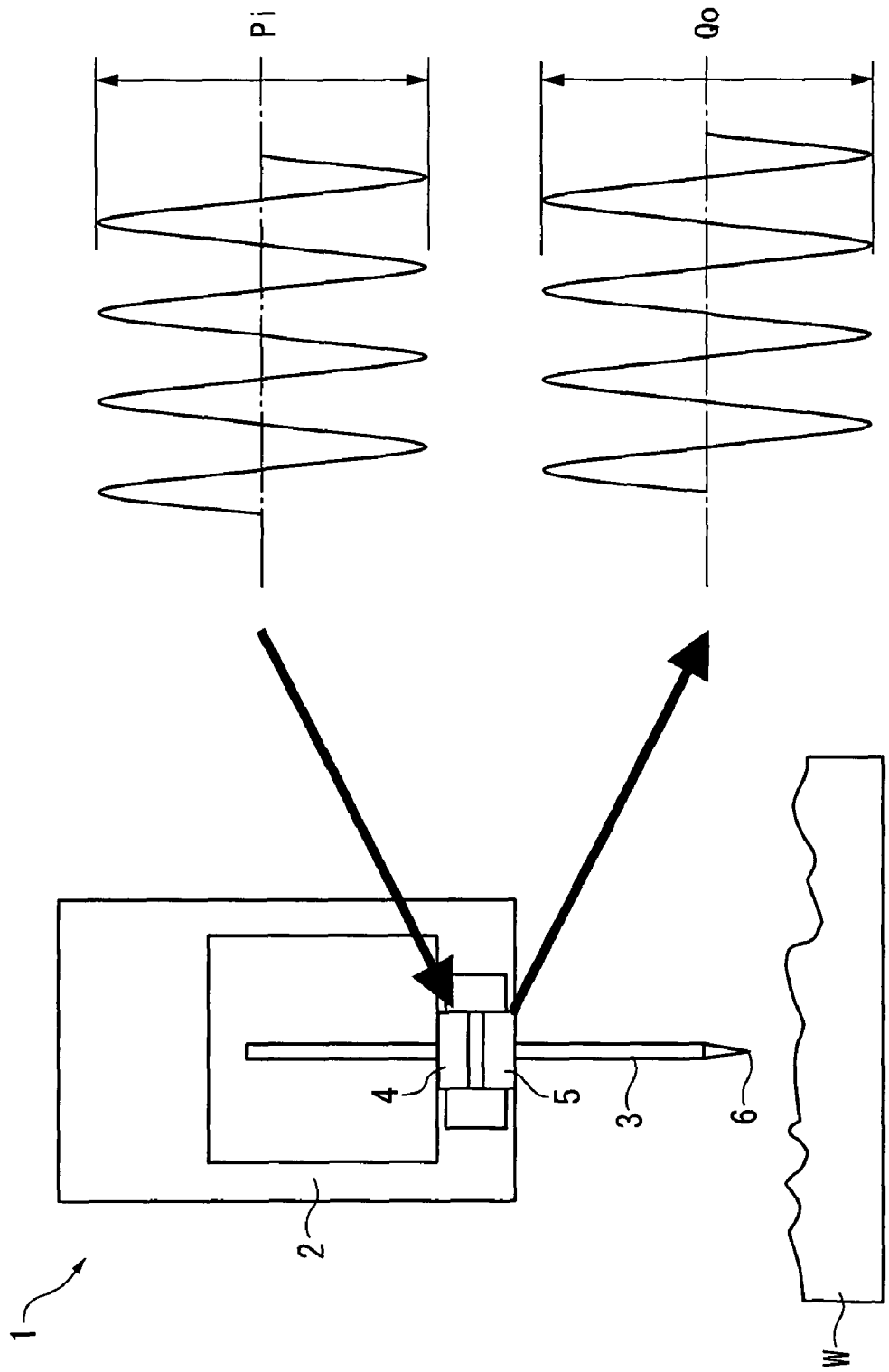
FIG. 8 is a diagram showing a vibration signal and a detection signal that are applied to the force sensor.
Figure 9:
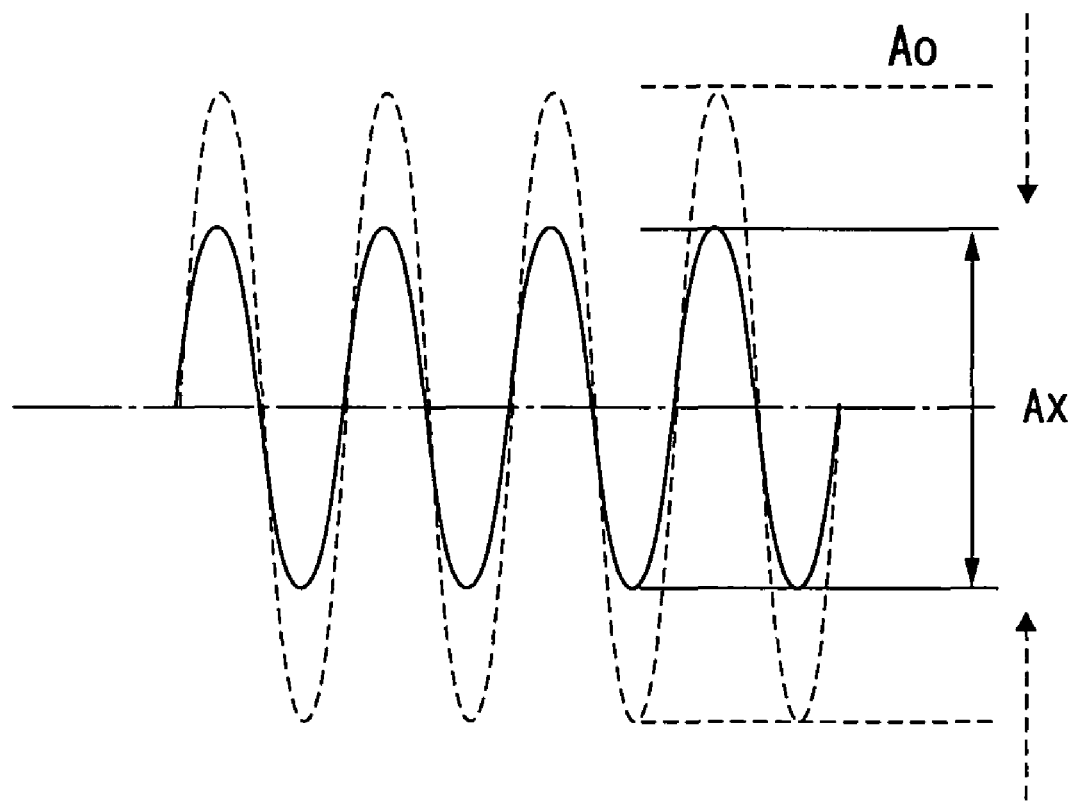
FIG. 9 is a diagram showing variation in the detection signal when the force sensor comes into contact with the workpiece.
Figure 10:
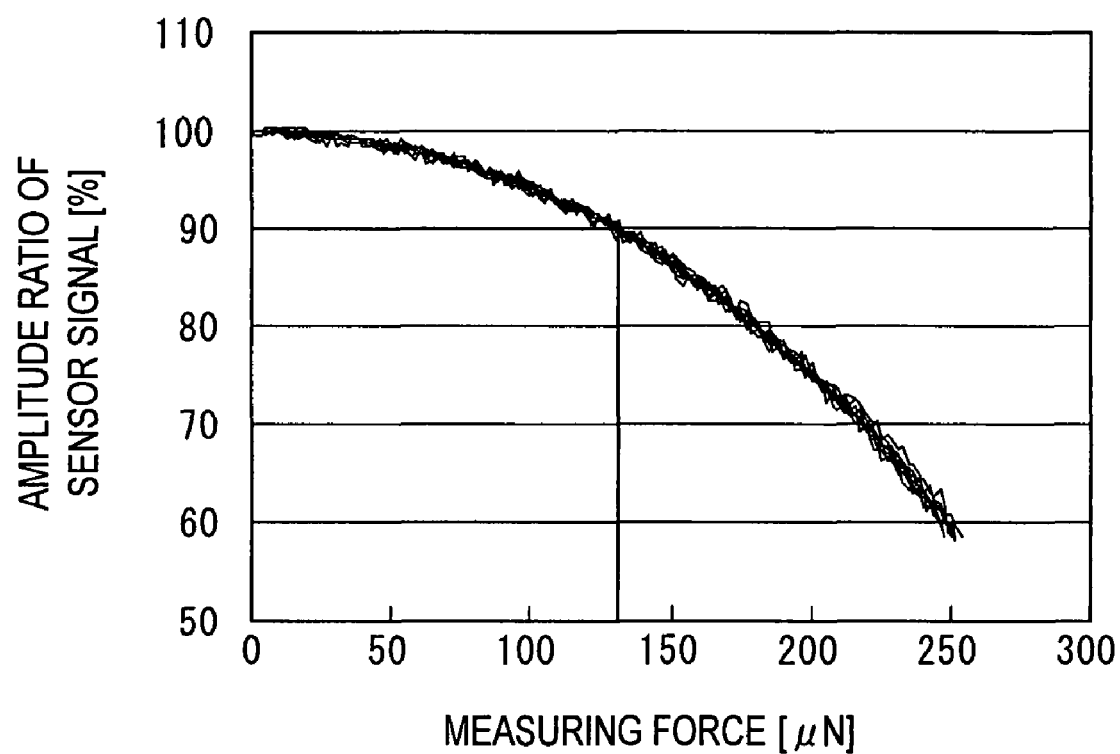
FIG. 10 is a diagram showing a relationship between an attenuation rate of the detection signal and a measuring force.

FIGS. 4A to 4D are each a schematic diagram showing a positional relationship of the force sensor and the workpiece in the measurement. Specifically, FIG. 4A shows an initial state; FIG. 4B shows a state in which the force sensor is moved by the X-direction driver, the Y-direction driver and the Z-direction driver from the state shown in FIG. 4A to the probe-controllable position; FIG. 4C shows a state in which the force sensor is moved by the actuator from the state shown in FIG. 4B to the close position under the position control; and FIG. 4D shows a state in which the force sensor is moved by the actuator from the state shown in FIG. 4C and brought into contact with the workpiece under the force control. FIG. 5 is a flowchart showing the measurement using the coordinate measuring instrument. FIG. 6 is a conceptual diagram showing how the workpiece is measured.

A measurer mounts a workpiece W on the mounting section 110 as shown in FIG. 4A.

The coordinate measuring instrument 10 operates the XYZ-drive controller 210 to drive the X-direction driver 162, the Y-direction driver 155 and the Z-direction driver 173 as shown in FIG. 5 (Step S1) and judges whether or not the force sensor 1 reaches the probe-controllable position as shown in FIG. 4B (Step S2). When it is judged that the force sensor 1 does not reach the probe-controllable position in Step S2, the process of Step S1 is performed.

On the other hand, when it is judged that the force sensor 1 reaches the probe-controllable position in Step S2, the approach controller 234 enables the position control loop RP to drive the actuator 133 under the position control (Step S3), and the coordinate measuring instrument 10 judges whether or not the force sensor 1 reaches the close position as shown in FIG. 4C (Step S4). When it is judged that the force sensor 1 does not reach the close position in Step S4, the process of Step S3 is performed.

On the other hand, when it is judged that the force sensor 1 reaches the close position in Step S4, the contact controller 235 enables the force control loop RF to drive the actuator 133 under the force control (Step S5). Then, as shown in FIG. 4D, the force sensor 1 is brought into contact with the workpiece W while keeping the force control, and the measurement is performed under the force control (Step S6).

With the above-described control, the contour of the workpiece W can be measured under the force control as shown in FIG. 6.

Advantage of Embodiment

According to the embodiment above, the following advantages can be attained.

(1) The coordinate measuring instrument 10 operates the approach controller 234 to enable the position control loop RP and drives the actuator 133 under the position control, thereby bringing the force sensor 1 to the close position. Then, when recognizing that the force sensor 1 reaches the close position, the contact controller 235 controls the switch 227 to enable the force control loop RF and drives the actuator 133 under the force control so that the force sensor 1 is brought into contact with the workpiece W.

With the arrangement, by switching the control from the position control to the force control before the force sensor 1 contacts with the workpiece W and by bringing the force sensor 1 into contact with the workpiece W under the force control, the overshoot at the time of contact can be suppressed as compared to a related art arrangement in which the force control is performed after the force sensor 1 contacts with the workpiece W. Specifically, although in the related art arrangement described earlier, overshoot of several micrometers to several tens of micrometers might occur, the present embodiment can reduce the overshoot to that of about 10 nm.

In addition, since only the force sensor 1 is moved instead of the entire probe 130, the inertia in moving the fore sensor 1 can be reduced, so that an increase of the overshoot due to the inertia can be suppressed.

Since a moving amount for bringing the force sensor 1 into contact with the workpiece W does not have to be preset, the present embodiment can be applied to the coordinate measuring instrument 10 in which a distance between a current position of the force sensor and the workpiece varies in accordance with the contour of the workpiece W.

Further, since the force sensor 1 is brought close to the workpiece W under the position control and then the control is switched to the force control, measurement efficiency can be prevented from degrading even in a measurement with a lot of measuring points.

Still further, the force sensor 1 can be moved by the single actuator 133, so that an arrangement for controlling the movement will not be complicated.

Accordingly, the overshoot in contacting the force sensor 1 with the workpiece W can be suppressed with such a simple arrangement and without degrading the measuring efficiency.

(2) The vibrating force sensor 1 including the stylus 3, the vibrating element 4 and the detecting element 5 is employed as the force sensor of the present invention.

The arrangement can suppress the overshoot in contacting the vibrating force sensor 1, which can perform highly accurate measurement with a small measuring force, with the workpiece W, thereby providing the coordinate measuring instrument 10 realizing a measurement with even higher accuracy.

(3) The coordinate measuring instrument 10 includes: the probe 130 having the force sensor 1, the scale detector 135, the actuator 133; the force control loop RF; the position control loop RP; the switch 227; the above-described approach controller 234 and contact controller 235; the Y-direction driver 155, the X-direction driver 162 and the Z-direction driver 173 for moving the probe 130; and the XYZ-drive controller 210 that controls the drivers 155, 162 and 173 to move the probe 130 to the probe-controllable position.

Accordingly, the coordinate measuring instrument 10 capable of attaining the advantages (1) and (2) can be provided.

Modification of Embodiment

The present invention is not limited to the embodiment above but includes the following modifications as long as the object of the present invention can be achieved.

As an example, although the force sensor 1 is formed by the base 2 and the stylus 3 that are integrated in the embodiment above, the force sensor 1 may alternatively be formed by separate components. Specifically, the base 2 and the stylus 3 may be individually prepared, where the stylus 3 is fixedly bonded to the base 3. As another example, although the stylus 3 is adapted to vibrate in the axial direction in the embodiment above, the stylus 3 may be vibrated in a direction orthogonal to the axis thereof.

As still another example, although the vibrating force sensor 1 is used in the embodiment above, the arrangement is not limited thereto. Another sensor may be employed as long as the sensor detects a measuring force generated when contacting with the workpiece and outputs the measuring force as a force detection signal.

The priority application Number JP2006-136628 upon which this patent application is based is hereby incorporated by reference.

What is claimed is:

1. A measurement control device, comprising:
   a probe including a force sensor that detects a measuring force generated when the probe contacts with a workpiece and outputs the measuring force as a force detection signal, a position detector that detects a measuring position of the workpiece detected by the force sensor and outputs the measuring position as measuring position information, and a force sensor moving unit that moves the force sensor relative to the workpiece;
   a force control loop that compares the force detection signal from the force sensor as a force fed-back signal with a set force value and drives the force sensor moving unit such that the force fed-back signal becomes equal to the set force value;
   a position control loop that compares the measuring position information from the position detector as a position fed-back signal with a set position value and drives the force sensor moving unit such that the position fed-back signal becomes equal to the set position value;
   a control loop switcher that enables one of the force control loop and the position control loop;
   an approach controller that controls the control loop switcher to enable the position control loop and drives the force sensor moving unit to move the force sensor to a close position, the close position being a position where the position fed-back signal becomes equal to the set position value; and
   a contact controller that, when recognizing that the force sensor is moved to the close position under the control of the approach controller, controls the control loop switcher to enable the force control loop and drives the force sensor moving unit to bring the force sensor into contact with the workpiece in such a manner that the force fed-back signal becomes equal to the set force value.

2. The measurement control device according to claim 1, wherein the force sensor includes a stylus having a contact section on a tip end thereof, a vibrating element that vibrates the stylus and a detecting element that detects a vibration state of the stylus and outputs the vibration state as a detection signal.

3. A measurement control method using a measurement control device including: a probe that includes a force sensor that detects a measuring force generated when the probe contacts with a workpiece and outputs the measuring force as a force detection signal, a position detector that detects a measuring position of the workpiece detected by the force sensor and outputs the measuring position as measuring position information, and a force sensor moving unit that moves the force sensor relative to the workpiece; a force control loop that compares the force detection signal from the force sensor as a force fed-back signal with a set force value and drives the force sensor moving unit such that the force fed-back signal becomes equal to the set force value; a position control loop that compares the measuring position information from the position detector as a position fed-back signal with a set position value and drives the force sensor moving unit such that the position fed-back signal becomes equal to the set position value; and a control loop switcher that enables one of the force control loop and the position control loop, the method comprising:
   controlling the control loop switcher to enable the position control loop and driving the force sensor moving unit to move the force sensor to a close position, the close position being a position where the position fed-back signal becomes equal to the set position value; and
   controlling, when recognizing that the force sensor is moved to the close position, the control loop switcher to enable the force control loop and driving the force sensor moving unit to bring the force sensor into contact with the workpiece in such a manner that the force fed-back signal becomes equal to the set force value.

* * * * *